(12) United States Patent
Annis et al.

(10) Patent No.: US 8,579,496 B2
(45) Date of Patent: Nov. 12, 2013

(54) STAND MIXER WIPING BEATER

(75) Inventors: James Stacy Annis, Stevensville, MI (US); Jeremy T. Wolters, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 559 days.

(21) Appl. No.: 12/898,008

(22) Filed: Oct. 5, 2010

(65) Prior Publication Data

US 2012/0081992 A1 Apr. 5, 2012

(51) Int. Cl.
*B01F 7/00* (2006.01)
*B01F 11/00* (2006.01)

(52) U.S. Cl.
USPC .......................................... 366/197; 366/343

(58) Field of Classification Search
USPC ........... 366/197, 199, 207, 342, 343, 98, 100, 366/129; 241/30–37.5
See application file for complete search history.

(56) References Cited

U.S. PATENT DOCUMENTS

| | | |
|---|---|---|
| 60,330 A | 12/1866 | Brand et al. |
| 176,775 A | 5/1876 | Croft |
| 290,033 A | 12/1883 | Ginn |
| 683,474 A | 10/1901 | Mackinzie |
| D55,815 S | 7/1920 | Pinkey |
| 1,415,735 A | 5/1922 | Trust et al. |
| 1,612,281 A | 11/1922 | Goetz |
| 1,674,903 A | 6/1928 | Johnston et al. |
| 1,826,242 A | 10/1931 | Dehuff |
| 1,872,004 A | 8/1932 | Rataiczak et al. |
| 2,027,756 A | 1/1936 | Tay |
| 2,178,269 A | 10/1939 | Seybert |
| 2,181,078 A | 11/1939 | Dehuff |
| D119,842 S | 4/1940 | Anstice |
| D134,247 S | 11/1942 | Moeller |
| 2,306,245 A | 12/1942 | Duke |
| 2,318,534 A | 5/1943 | Seybert |
| 2,562,790 A | 7/1951 | Houston, Jr. |
| 2,574,391 A | 11/1951 | Herrly |
| 2,753,160 A | 7/1956 | Gunn, Sr. |
| 2,793,012 A | 5/1957 | Wolf |
| 3,073,579 A | 1/1963 | Detrick |
| 3,415,497 A | 12/1968 | Johnson |
| 3,914,956 A | 10/1975 | Knight |
| 4,183,680 A | 1/1980 | Manfroni |
| 4,190,371 A | 2/1980 | Durr et al. |
| 4,197,018 A | 4/1980 | Groen, Jr. |
| 4,337,000 A | 6/1982 | Lehmann |

(Continued)

FOREIGN PATENT DOCUMENTS

| | | |
|---|---|---|
| DE | 10242242 A1 | 3/2004 |
| EP | 0406679 A1 | 1/1991 |
| WO | 2006083560 A2 | 8/2006 |

OTHER PUBLICATIONS

Reexam of U.S. Patent No. 7,314,308 Cintrik NI, U.S. Appl. No. 90/010575, Fallowes, Dec. 23, 2010.

*Primary Examiner* — Tony G Soohoo
*Assistant Examiner* — Anshu Bhatia

(57) ABSTRACT

A mixing beater for a small appliance includes a metallic frame including an arm; a rigid plastic shell extending over the arm; and only one scraper. The scraper extends over the rigid plastic shell and has a flexible blade configured to contact an inner surface of a mixing bowl when viewed in a first plane.

13 Claims, 5 Drawing Sheets

(56) References Cited

U.S. PATENT DOCUMENTS

| | | |
|---|---|---|
| 4,525,072 A | 6/1985 | Giusti |
| 4,613,086 A | 9/1986 | Granum et al. |
| 4,854,717 A | 8/1989 | Crane et al. |
| 4,944,600 A | 7/1990 | McKelvey |
| 4,946,285 A | 8/1990 | Vennemeyer |
| 5,009,510 A | 4/1991 | Gabriele |
| 5,208,939 A * | 5/1993 | Oulie .................. 15/250.452 |
| 5,556,201 A | 9/1996 | Veltrop et al. |
| 5,568,976 A | 10/1996 | Gabriele |
| 5,791,777 A | 8/1998 | Mak |
| 5,911,505 A | 6/1999 | St. John et al. |
| 5,975,753 A | 11/1999 | Meyer |
| D421,030 S | 2/2000 | Panaccione et al. |
| 6,652,137 B1 | 11/2003 | Bosch et al. |
| 6,866,413 B2 | 3/2005 | Donthnier et al. |
| 6,932,503 B2 | 8/2005 | Fallowes |
| 7,270,473 B2 | 9/2007 | Donthnier et al. |
| 7,314,308 B2 | 1/2008 | Fallowes et al. |
| 2006/0171251 A1 | 8/2006 | Busick |
| 2006/0209629 A1 | 9/2006 | Fallowes et al. |
| 2006/0268659 A1 | 11/2006 | Kaas |

\* cited by examiner

STAND MIXER WIPING BEATER

CROSS-REFERENCE

Cross-reference is made to co-pending U.S. Design patent application Ser. No. 29/376,285 entitled "Wiping Beater," which was filed on Oct. 5, 2010 and is incorporated herein by reference.

TECHNICAL FIELD

The present disclosure relates generally to stand mixer appliance. The present disclosure relates more particularly to a mixing beater for a stand mixer.

BACKGROUND

A portable appliance, or small appliance, such as a stand mixer, is a device that may be used in the preparation of meals and other foodstuffs. Typically, stand mixers are intended to be used on tabletops, countertops, or other platforms. Many stand mixers include a motor and electronics to control the operation of the motor and a mixing element. Illustrative examples of such mixing elements include mixing beaters, dough hooks, and wire whips.

SUMMARY

According to one aspect, a mixing beater for a stand mixer is disclosed. The mixing beater includes a metallic frame including an arm, a rigid plastic shell extending over the arm, and only one scraper. The one scraper extends over the rigid plastic shell and has a flexible blade configured to contact an inner surface of a mixing bowl when viewed in a first plane.

In some embodiments, the one scraper may be formed from a thermoplastic elastomer. In some embodiments, the rigid plastic shell may be formed from polypropylene. Additionally, in some embodiments, the metallic frame may be formed from aluminum.

In some embodiments, the metallic frame may include a central shaft defining an axis, and the arm may extend from the central shaft. In some embodiments, the arm may extend parallel to the axis when viewed in a second plane extending orthogonally to the first plane. Additionally, in some embodiments, an angle may be defined between the arm and the axis when viewed in the first plane.

In some embodiments, the flexible blade may have a curved edge configured to contact the inner surface of the mixing bowl. The curved edge may be tapered when viewed in a second plane extending orthogonally to the first plane.

According to another aspect, a stand mixer is disclosed. The stand mixer includes a mixing bowl including an inner surface and a beater positioned in the mixing bowl. The beater includes a metallic frame, a rigid plastic shell molded to the metallic frame, and only one scraper molded to the rigid plastic shell. The one scraper is formed from a thermoplastic elastomer and has a curved flexible blade configured to contact the curved inner surface of the mixing bowl.

In some embodiments, the metallic frame may include a central shaft and a first arm extending from the central shaft. The one scraper may extend over the first arm. In some embodiments, the central shaft may define an axis, and the first arm may extend parallel to the axis when viewed in a first plane.

In some embodiments, the metallic frame may include a second arm extending from the central shaft and parallel to the axis when viewed in the first plane.

According to another aspect, the stand mixer includes a mixer head having a drive shaft, a mixing bowl positioned under the drive shaft, and a beater configured to be coupled to the drive shaft. The mixing bowl includes an inner surface. The beater includes a metallic frame including a first arm extending in a first direction and a second arm extending in a second direction, a rigid plastic shell extending over the first arm, and only one scraper. The one scraper extends over the rigid plastic shell, is formed from a thermoplastic elastomeric, and has a flexible blade configured to contact the inner surface of the mixing bowl.

BRIEF DESCRIPTION OF THE DRAWINGS

The detailed description particularly refers to the following figures, in which.

DETAILED DESCRIPTION OF THE DRAWINGS

Figure 1:
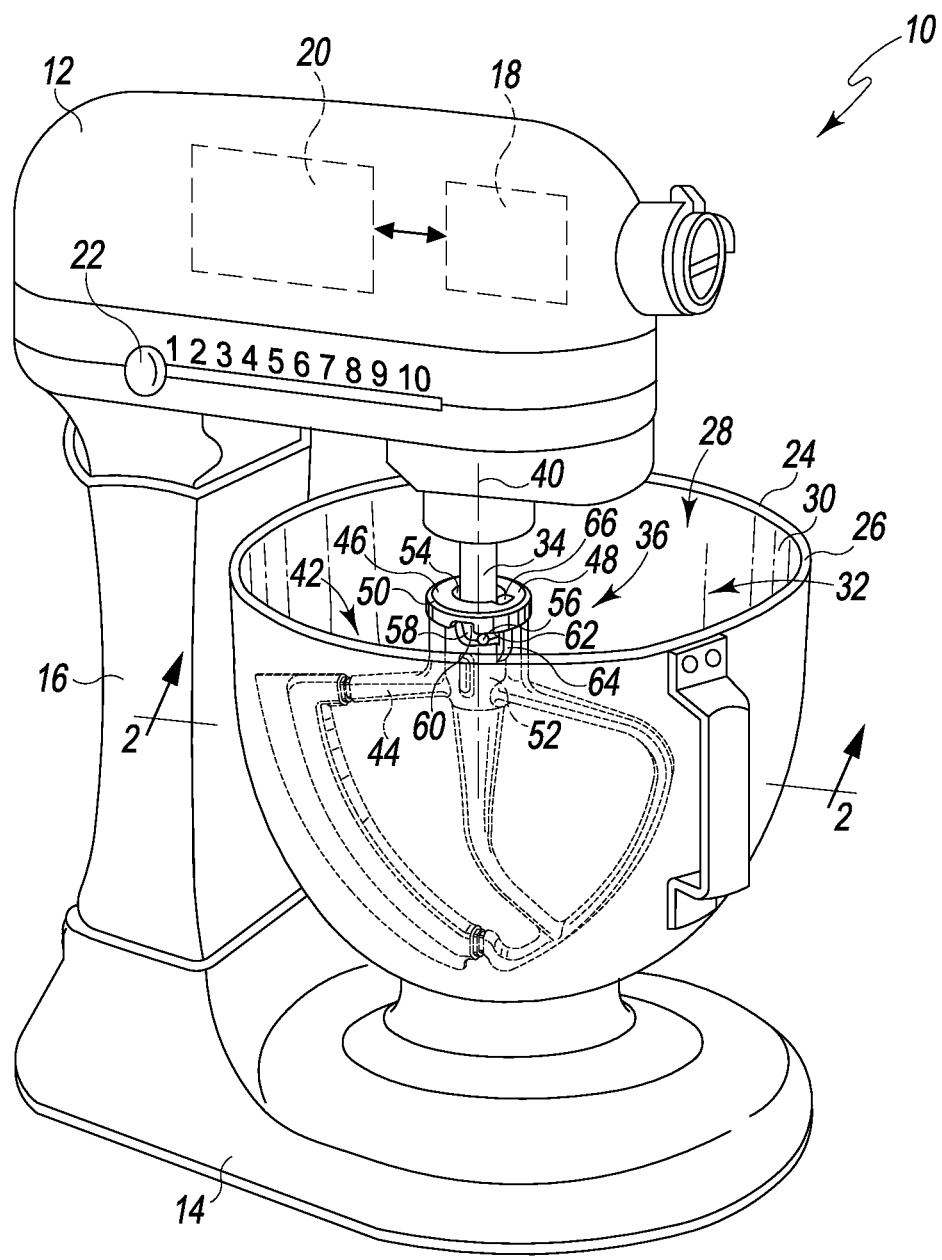
FIG. 1 is a perspective view of one embodiment of a mixing beater positioned in a mixing bowl of a stand mixer.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a stand mixer appliance 10 (hereinafter "stand mixer") is shown in FIG. 1. The stand mixer 10 has a mixer head 12, a base 14, and an upstanding pedestal 16 extending upwardly from the base 14. The pedestal 16 supports the mixer head 12, which encases a motor 18 and associated electronic motor controls 20. In some embodiments, the motor 18 and/or the motor controls 20 may be alternatively located in any part of the base 14, including the upstanding pedestal 16. As shown in FIG. 1, the stand mixer 10 is a bowl-lift stand mixer, such as, for example, the KP-26 Stand Mixer available from KitchenAid® of St. Joseph, Mich. In other embodiments, the stand mixer may be, for example, a tilt-head stand mixer such as the KSM150 Stand Mixer available from KitchenAid® of St. Joseph, Mich.

A user control 22 is also included on the stand mixer 10. The user control 22 is illustratively embodied in FIG. 1 as a sliding speed control knob 22 mounted in the mixer head 12. The user may choose a desired speed setting with the control knob 22, and the motor controls 20 will generally attempt to operate the motor 18 at the desired speed. As shown in FIG. 1, the sliding speed control knob 22 is configured for multiple discrete speeds, indexed from 0 to 10, with an increment of 1. It will be appreciated that in other embodiments the user control 22 may be any type of analog or digital user interface operable to input a desired speed setting for the stand mixer 10.

The stand mixer 10 includes a mixing bowl 24, which is supported on the base 14. The mixing bowl 24 includes a sidewall 26 extending downwardly from a circular opening 28. The sidewall 26 includes a curved inner surface 30 that defines a mixing chamber 32. It will be appreciated that in other embodiments the inner surface 30 of the bowl 24 may straight rather than curved. As shown in FIG. 1, the mixing chamber 32 is positioned below a drive shaft 34 extending downwardly from the mixer head 12.

A mixing beater 36 is releasably attached to the drive shaft 34 for rotation thereby. The mixing beater 36 mixes foodstuffs and other items in a mixing bowl 24, which is supported on the base 14. In the illustrative embodiment, the motor 18 is configured to provide motive power to the mixing beater 36 via a planetary gear system. The use of the planetary gear system creates a complex rotational motion for the mixing beater 36 because the mixing beater 36 orbits around a rotation axis 38 (see FIG. 2) of a sun gear and rotates along a rotation axis 40 extending through the drive shaft 34.

As shown in FIGS. 1-4, the mixing beater 36 is embodied as a wiping beater 42. The beater 42 includes a frame 44 formed from die cast aluminum alloy. It will be appreciated that in other embodiments the frame 44 may be formed from other suitable metallic materials such as, for example, stainless steel. In the illustrative embodiment, the frame 44 is cast as a single monolithic component, but it will be appreciated that in other embodiments the frame 44 may be an assembly of multiple components.

The frame 44 includes a collar 46 removably secured to the drive shaft 34 of the mixer head 12. The collar 46 has a central shaft 48 extending along the rotation axis 40 from an upper end 50 to a lower end 52. The central shaft 48 has a bore 54 defined therein that extends downwardly from the upper end 50 and receives the drive shaft 34 of the mixer head 12. As shown in FIG. 1, a locking pin 56 extending outwardly from the drive shaft 34 is received in a slot 58 formed in the central shaft 48.

To detach the beater 42 from the drive shaft 34, the user presses the beater 42 upward to advance the pin 56 along a first vertical segment 60 of the slot 58. The user rotates the collar 46 relative to the drive shaft 34, thereby moving the pin 56 along a horizontal segment 62 of the slot 58 to an end 64, as shown in FIG. 1. After the pin 56 has been moved to the end 64, the user may pull the beater 42 downward, which advances the pin 56 along a second vertical segment 66 of the slot 58, thereby allowing the user to remove the beater 42 from the drive shaft 34. It will be appreciated that in other embodiments the slot 58 may include additional or fewer segments than those shown in FIG. 1.

Figure 2:
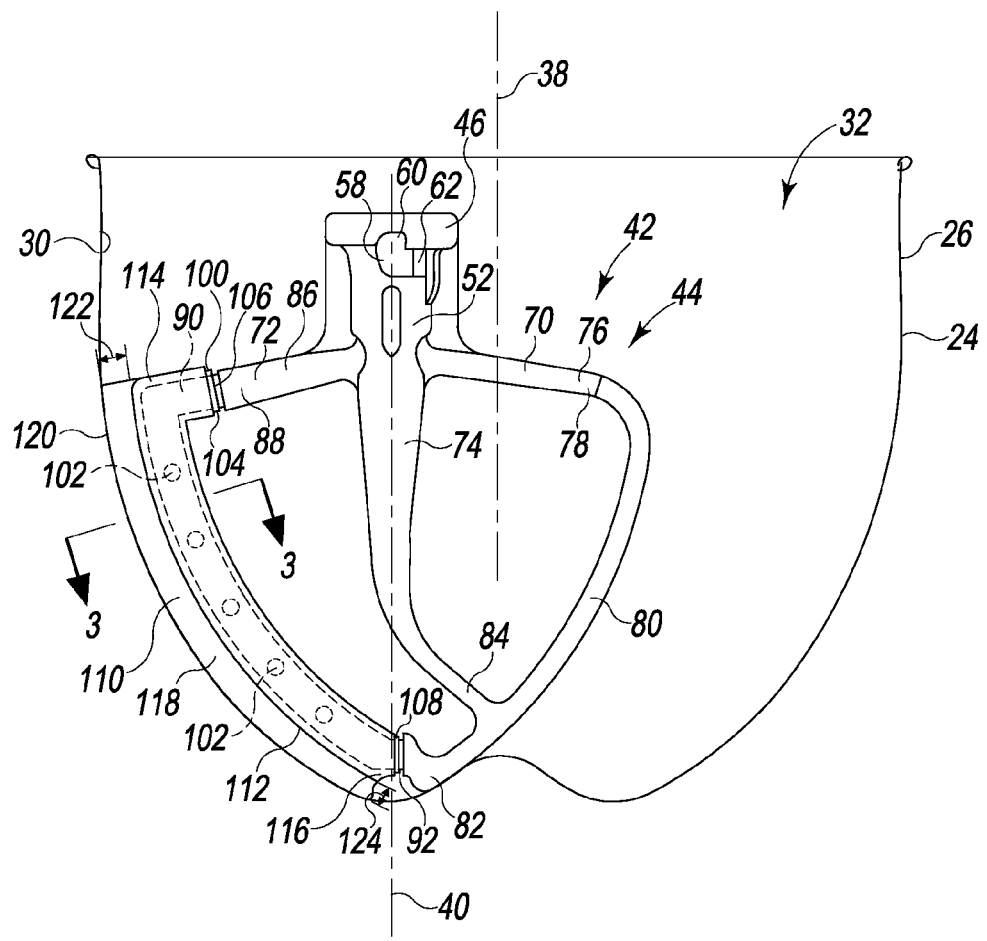
FIG. 2 is a cross-section elevation view of the mixing bowl taken along the line 2-2 shown in FIG. 1.

Referring now to FIG. 2, the beater 42 is shown positioned in the mixing chamber 32 of the mixing bowl 24. The frame 44 includes a pair of arms 70, 72 and a support rib 74 extending from the lower end 52 of the collar 46. Each of the arms 70, 72 extends from the lower end 52 in different directions. It will be appreciated that in other embodiments the frame 44 may include additional or fewer arms.

The arm 70 includes an upper branch 76 extending outwardly from the collar 46 to an end 78. The arm 70 also includes a branch 80 that extends downwardly from the end 78 to a tip 82. The curvature of the branch 80 of the arm 70 corresponds to the curved inner surface 30 of the mixing bowl 24. It will be appreciated that in some embodiments the branch 80 may be straight rather than curved. The support rib 74 extends downwardly from the collar 46 to a lower end 84 secured to the branch 80 near the tip 82. It will be appreciated that additional support ribs may be added to increase the rigidity of the frame 44 and may be attached to both or either of the arms 70, 72. Additionally, any of the support ribs may be attached to the arms 70, 72 at other points.

The arm 72, like the arm 70, includes an upper branch 86 extending outwardly from the collar 46 to an end 88. The arm 72 also includes another branch 90 that extends from the end 88 to a tip 92. The curvature of the branch 90 of the arm 72 corresponds to the curved inner surface 30 of the mixing bowl 24. In other embodiments, the branch 90 may straight rather than curved. As shown in FIG. 2, the tip 92 of the arm 72 is connected to the tip 82 of the arm 70. It will be appreciated that in other embodiments the may the tips 82, 92 may be free ends that are not connected directly together.

Figure 3:
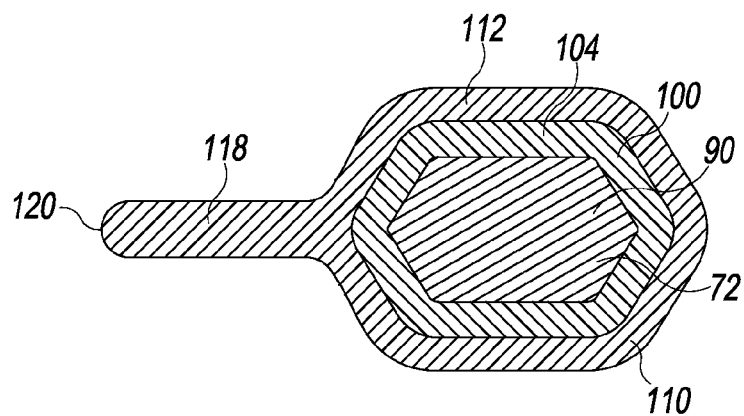
FIG. 3 is a cross-section view of the mixing beater taken along the line 3-3 shown in FIG. 2.

As shown in FIGS. 2-3, the beater 42 includes a shell 100 injection molded to the branch 90 of the arm 72. The branch 90 of the arm 72 has a plurality of holes 102 defined therein, and the shell 100 is formed from a plastic material that flows over the arm 72 and into the holes 102 during the injection molding process. When the plastic material cools, the rigid body 104 of the shell 100 is formed, and the shell 100 is secured to the arm 72. In other embodiments, the arm 72 may include pockets in addition to, or in place of, the holes 102, which receive the plastic material. It will also be appreciated that in other embodiments the arm 72 may not have pockets, holes, or any other opening formed along the length thereof.

As shown in FIG. 2, the body 104 of the shell 100 extends from an upper end 106 positioned adjacent to the end 88 of the upper branch 86 of the arm 72 to a lower end 108 positioned adjacent to the tip 92 of the branch 90. In the illustrative embodiment, the plastic material of the shell 100 is polypropylene, but it will be appreciated that in other embodiments other polymers may be used.

As best seen in FIG. 3, the shell 100 is positioned between the arm 72 and a scraper 110. The scraper 110 is formed from a thermoplastic elastomer such as, for example, Santoprene™ thermoplastic vulcanizate (TPV), which is commercially available from Exxon Mobil Chemical Company of Houston, Tex., U.S.A. It will be appreciated that in other embodiments other thermoplastic elastomers may be used. The scraper 110 has a body 112 that is secured to the shell 100 and extends over the branch 90 of the arm 72 from an upper end 114 to a lower end 116. The body 112 of the scraper 110 is molded to the shell 100 such that a mechanical bond is formed between the shell 100 and the scraper 110. In that way, the shell 100 couples the scraper 110 to the frame 44.

The scraper 110 includes a flexible blade 118 extending outwardly from the body 112 to a curved edge 120. The edge 120 of the blade 118 is shaped to correspond to and follow the inner surface 30 of the mixing bowl 28. In other embodiments, the shape of the edge 120 may vary from the shape of the inner surface 30 of the mixing bowl 28. The blade 118 is tapered along its length, having a width 122 at the upper end 114 of the scraper 110 and gradually decreasing to a more narrow width 124 at the lower end 116. In other embodiments, the width 122 at the upper end 114 of the scraper may be less than the width 124 at the lower end 116, i.e., the blade 118 may be tapered in the opposite direction from that shown in FIG. 2. Additionally, in other embodiments, the degree or amount of taper may be different from that shown in FIG. 2. It will also be appreciated that in other embodiments the width of the blade 118 may be consistent along the length of the blade 118.

Figure 4:
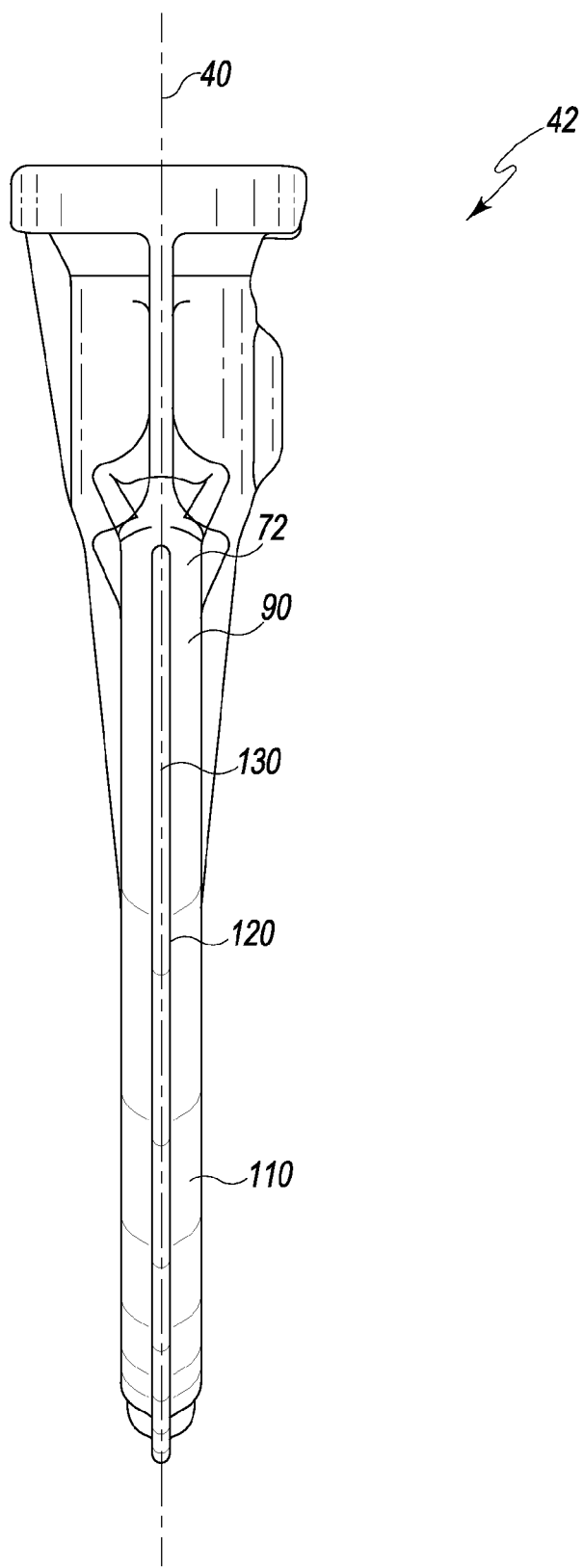
FIG. 4 is a side elevation view of the mixing beater of FIGS. 1-3.

Referring now to FIG. 4, the beater 42 is shown in a view that is orthogonal to the view shown in FIG. 2. A longitudinal axis 130 defined by the branch 90 is shown extending through the arm 72. The longitudinal axis 130 extends parallel to the rotation axis 40. In other words, the branch 90 of the arm 72 extends parallel to the rotation axis 40. The branch 80 (not shown) of the arm 70 similarly extends parallel to the rotation axis 40. Additionally, as shown in FIG. 4, the edge 120 of the scraper 110 is aligned with the rotation axis 40.

In use, the complex rotational motion of the beater 42 created by the planetary gear system periodically brings the edge 120 of the scraper 110 into contact with inner surface 30 of the mixing bowl 24 (see FIG. 2). As the beater 42 is rotated about the rotation axis 40, the blade 118 passes along a portion of the inner surface 30, and the scraper 110 removes food particles from the inner surface 30. This wiping action of the scraper 110 prevents food particles from remaining on the inner surface 30 and enhances the mixing of the foodstuffs within the mixing bowl 24. It will be appreciated that in other embodiments the scraper 110 may enhance the mixing of the food stuffs when the edge 120 of the scraper 110 passes very close to the inner surface 30 of the mixing bowl 24. In such embodiments, the edge 120 may or may not contact the inner surface 30.

Figure 5:
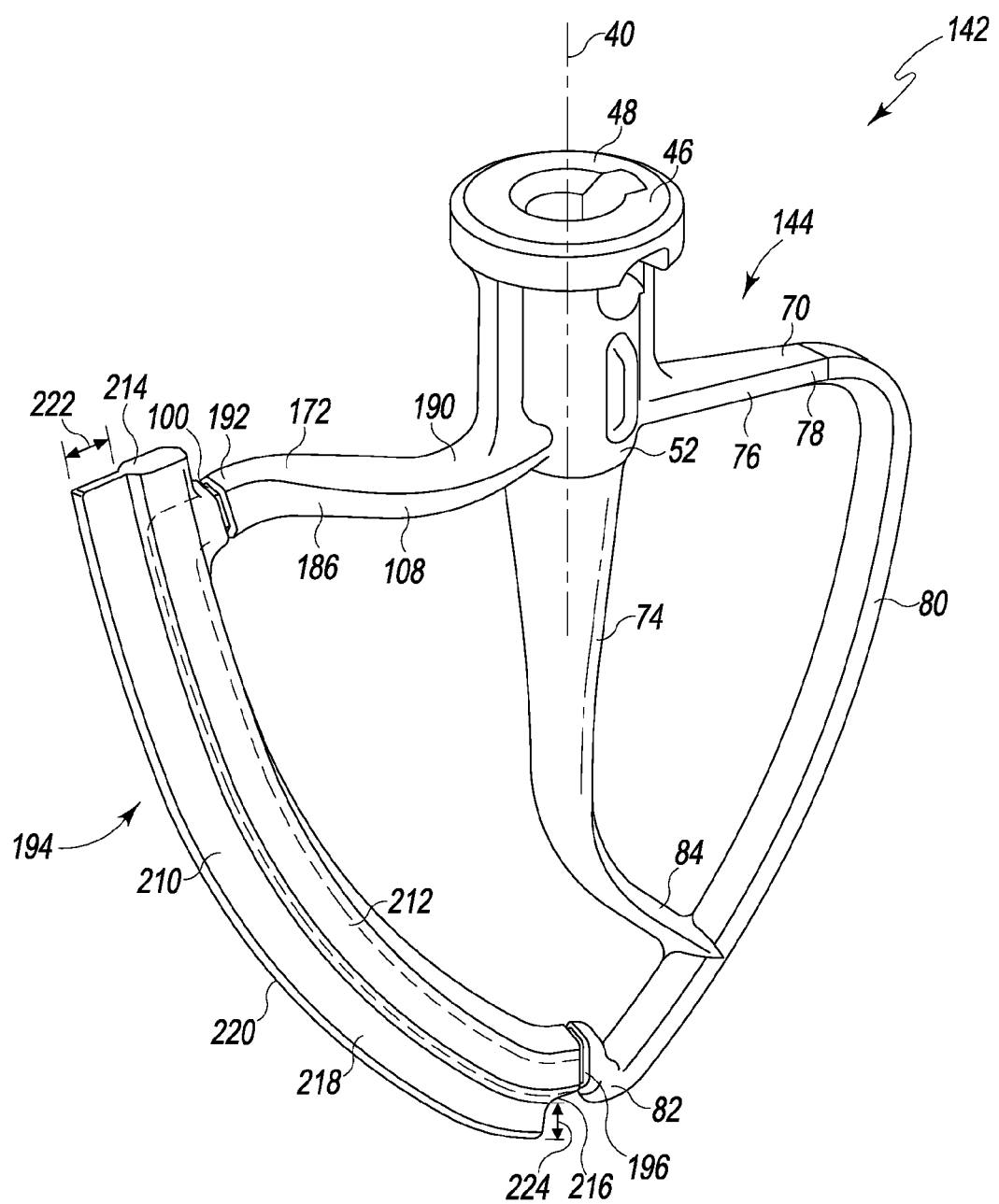
FIG. 5 is a perspective view of another embodiment of the mixing beater.
Figure 6:
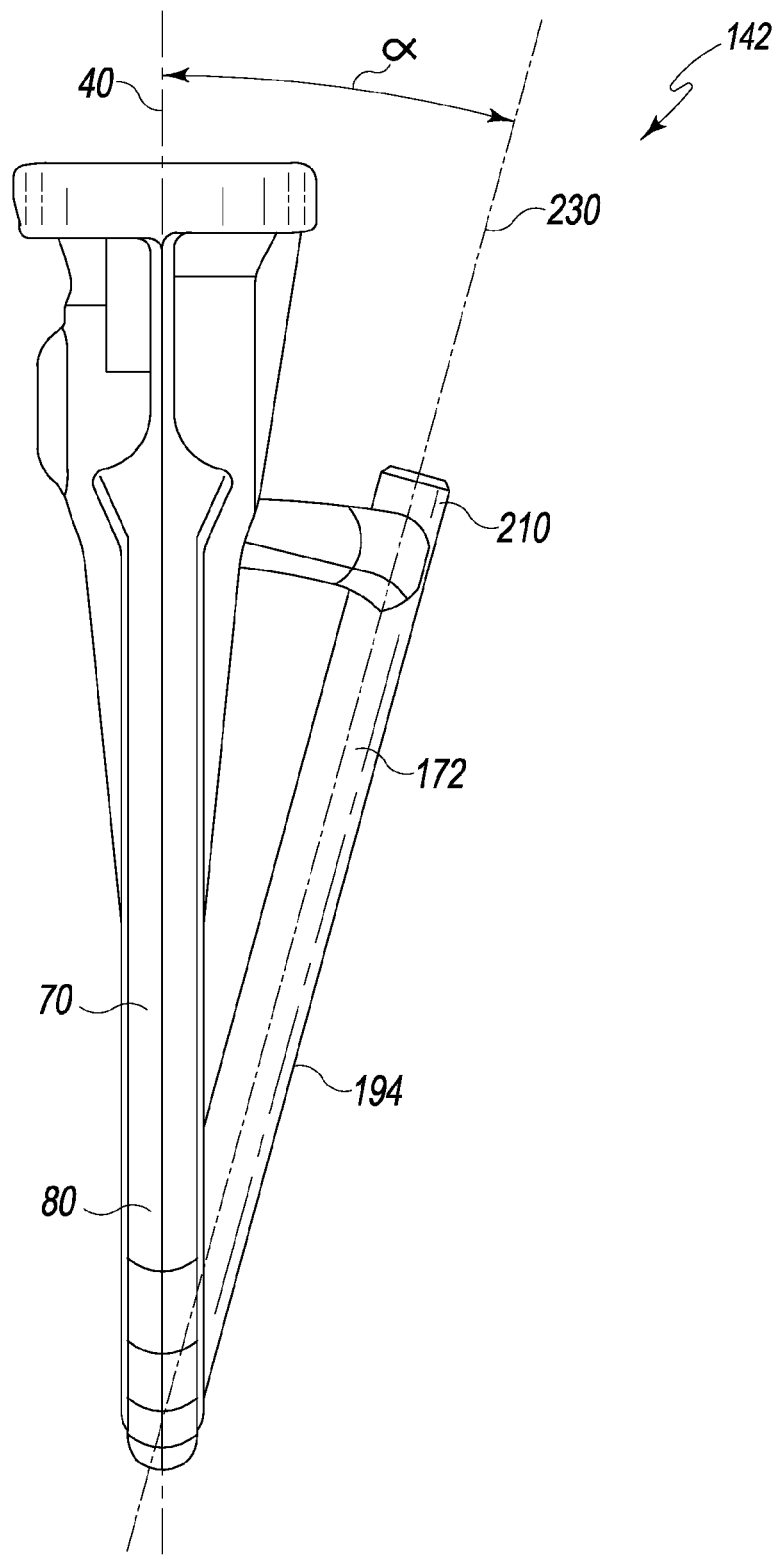
FIG. 6 is a side elevation view of the mixing beater of FIG. 5.

Referring now to FIGS. 5 and 6, a different embodiment of a mixing beater 36 (hereinafter referenced as a wiping beater or beater 142) is shown. Some features of the embodiment illustrated in FIGS. 5 and 6 are substantially similar to those discussed above in reference to the embodiment of FIGS. 1-4. Such features are designated in FIGS. 5 and 6 with the same reference numbers as those used in FIGS. 1-4.

Referring now to FIG. 5, the beater 142 has a frame 144 formed from die cast aluminum alloy. The frame 144 includes a collar 46 that is configured to be removably secured to the drive shaft 34 of the mixer head 12. The rotation axis 40 of the beater 142 extends downwardly through a central shaft 48 of the collar 46.

The frame 144 also includes a pair of arms 70, 172 and a support rib 74 extending from a lower end 52 of the collar 46. The arm 70 includes an upper branch 76 extending outwardly from the collar 46 to an end 78. The arm 70 also includes a branch 80 that extends downwardly from the end 78 to a tip 82. The curvature of the branch 80 of the arm 70 corresponds to the curved inner surface 30 of the mixing bowl 24. The support rib 74 extends downwardly from the collar 46 to a lower end 84 secured to the branch 80 near the tip 82.

The arm 172 of the frame 144 includes an upper branch 186 having a body 188 extending from an end 190 secured to the collar 46 to an end 192. As shown in FIG. 5, the body 188 is curved between the ends 190, 192 such that the end 192 is offset from the end 190. The arm 172 also includes another branch 194 secured to the end 192 and extending downwardly to a tip 196. The tip 196 of the arm 172 is connected to the tip 82 of the arm 70. The curvature of the branch 194 of the arm 172 corresponds to the curved inner surface 30 of the mixing bowl 24.

The beater 142 also includes a shell 100 injection molded to the branch 194 of the arm 172 and positioned between the arm 172 and a scraper 210. Like the scraper 110, the scraper 210 is formed from a thermoplastic elastomer. The scraper 210 has a body 212 that is secured to the shell 100. The body 212 extends from an upper end 214 positioned above the upper branch 186 of the arm 172 to a lower end 216. The body 212 of the scraper 110 is molded to the shell 100 such that a mechanical bond is formed between the shell 100 and the scraper 210. In that way, the shell 100 couples the scraper 210 to the frame 144.

The scraper 210 includes a flexible blade 218 extending outwardly from the body 212 to a curved edge 220. The edge 220 of the blade 218 is shaped to correspond to and follow the inner surface 30 of the mixing bowl 28. The blade 218 is tapered along its length, having a width 222 at the upper end 214 of the scraper 210 and gradually decreasing to a more narrow width 224 at the lower end 216.

Referring now to FIG. 6, one side of the beater 142 is shown. A longitudinal axis 230 defined by the branch 194 extends through the arm 172. In that view, an angle α is defined between the longitudinal axis 230 of the arm 172 and the rotation axis 40 such that the scraper 210 is angled downward. In that way, an angle is defined between the arm 172 and the rotation axis 40. In the illustrative embodiment, the angle α is equal to approximately 15 degrees. While the branch 194 of the arm 172 is angled related to the rotation axis 40, the branch 80 of the arm 70 extends parallel to the rotation axis 40.

In use, the complex rotational motion of the beater 142 created by the planetary gear system periodically brings the edge 220 of the scraper 210 into contact with inner surface 30 of the mixing bowl 24. As the beater 142 is rotated about the rotation axis 40, the blade 218 passes along a portion of the inner surface 30, and the scraper 210 removes food particles from the inner surface 30. Because the scraper 210 is angled downward, food particles are pushed down and toward the center of the mixing bowl 24. The wiping action of the scraper 210 prevents food particles from remaining on the inner surface 30 and enhances the mixing of the foodstuffs within the mixing bowl 24.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A mixing beater for a stand mixer, comprising:
   a metallic frame including an arm;
   a rigid plastic shell encompassing the arm; and
   only one scraper, wherein the one scraper (i) encompasses the rigid plastic shell and (ii) has a flexible blade configured to contact an inner surface of a mixing bowl when viewed in a first plane.

2. The mixing beater of claim 1, wherein the one scraper is formed from a thermoplastic elastomer.

3. The mixing beater of claim 1, wherein the rigid plastic shell is formed from polypropylene.

4. The mixing beater of claim 1, wherein the metallic frame is formed from aluminum.

5. The mixing beater of claim 1, wherein the metallic frame includes a central shaft defining an axis, and the arm extends from the central shaft.

6. The mixing beater of claim 5, wherein the arm extends parallel to the axis when viewed in a second plane extending orthogonally to the first plane.

7. The mixing beater of claim 5, wherein an angle is defined between the arm and the axis when viewed in a second plane extending orthogonally to the first plane.

8. The mixing beater of claim 1, wherein the flexible blade has a curved edge configured to contact the inner surface of the mixing bowl, and the curved edge is tapered when viewed in the first plane.

9. A stand mixer comprising:
   a mixing bowl including an inner surface; and
   a beater positioned in the mixing bowl, the beater comprising (i) a metallic frame, (ii) a rigid plastic shell molded to the metallic frame, and (iii) only one scraper molded to the rigid plastic shell, wherein the one scraper is formed from a thermoplastic elastomer and has a curved flexible blade configured to contact the inner surface of the mixing bowl.

10. The stand mixer of claim 9, wherein the metallic frame includes a central shaft and a first arm extending from the central shaft, and the one scraper extends over the first arm.

11. The stand mixer of claim 10, wherein the central shaft defines an axis, and the first arm extends parallel to the axis when viewed in a first plane.

12. The stand mixer of claim 11, wherein the metallic frame includes a second arm extending from the central shaft and parallel to the axis when viewed in the first plane.

13. A stand mixer comprising:
   a mixer head having a drive shaft;
   a mixing bowl positioned under the drive shaft, the mixing bowl including an inner surface; and
   a beater configured to be coupled to the drive shaft, the beater comprising (i) a metallic frame including a first arm extending in a first direction and a second arm extending in a second direction, (ii) a rigid plastic shell extending over the first arm, and (iii) only one scraper,
   wherein the one scraper (i) extends over the rigid plastic shell, (ii) is formed from a thermoplastic elastomer, and (iii) has a flexible blade configured to contact the inner surface of the mixing bowl.

* * * * *